(12) United States Patent
Terasaki (10) Patent No.: US 8,240,624 B2
(45) Date of Patent: Aug. 14, 2012

(54) PISTON POSITION DETECTING DEVICE OF FLUID PRESSURE CYLINDER

(75) Inventor: Atsushi Terasaki, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 506 days.

(21) Appl. No.: 12/331,871

(22) Filed: Dec. 10, 2008

(65) Prior Publication Data

US 2009/0159765 A1   Jun. 25, 2009

(30) Foreign Application Priority Data

Dec. 19, 2007   (JP) ................................. 2007-327164

(51) Int. Cl.
*A47B 96/06* (2006.01)

(52) U.S. Cl. .................... 248/230.8; 248/313; 248/74.3; 73/866.5; 310/13

(58) Field of Classification Search ................. 248/542, 248/543, 225.11, 229.1, 230.1, 230.7, 230.8; 248/313, 316.1, 62, 74.1, 74.3, 309.1, 310; 73/866.5, 493, 756; 324/173; 310/13, 14
See application file for complete search history.

(56) References Cited

U.S. PATENT DOCUMENTS

| | | | | | |
|---|---|---|---|---|---|
| 3,745,392 | A | * | 7/1973 | Phoenix et al. | 310/168 |
| 3,911,302 | A | * | 10/1975 | DeClaire | 310/168 |
| 4,090,099 | A | * | 5/1978 | Daffron | 310/168 |
| 4,161,685 | A | | 7/1979 | Jacob | |
| 4,793,241 | A | * | 12/1988 | Mano et al. | 92/5 R |
| 5,063,345 | A | * | 11/1991 | Akiyama | 324/173 |
| 5,231,352 | A | * | 7/1993 | Huber | 324/207.24 |
| 6,089,111 | A | * | 7/2000 | Machijima | 73/866.5 |
| 6,152,172 | A | * | 11/2000 | Christianson et al. | 137/554 |
| 6,520,065 | B2 | * | 2/2003 | Sakurai et al. | 92/5 R |
| 6,523,425 | B1 | * | 2/2003 | Kubik | 73/866.5 |
| 6,571,681 | B2 | * | 6/2003 | Sakurai | 92/5 R |
| 6,789,570 | B2 | * | 9/2004 | Beyrak et al. | 137/554 |
| 6,929,332 | B2 | * | 8/2005 | Naslund et al. | 301/124.1 |
| 7,250,753 | B2 | | 7/2007 | Terasaki | |
| 7,557,568 | B2 | * | 7/2009 | Terasaki | 324/207.24 |
| 7,559,521 | B2 | * | 7/2009 | White et al. | 248/314 |
| 7,886,767 | B2 | * | 2/2011 | Tschida et al. | 137/554 |
| 2002/0100336 | A1 | * | 8/2002 | Sakurai | 73/866.5 |
| 2009/0025551 | A1 | | 1/2009 | Terasaki | |

FOREIGN PATENT DOCUMENTS

| | | |
|---|---|---|
| DE | 69 47 597 U | 5/1971 |
| DE | 28 19 818 A1 | 6/1979 |
| DE | 41 27 205 C2 | 2/1993 |
| DE | 690 30 328 T2 | 7/1997 |
| EP | 0 670 012 B1 | 3/1997 |

(Continued)

*Primary Examiner* — Terrell McKinnon
*Assistant Examiner* — Eret McNichols
(74) *Attorney, Agent, or Firm* — Oblon, Spivak, McClelland, Maier & Neustadt, L.L.P.

(57) ABSTRACT

A piston position detecting device includes a position sensor, a fixing screw for attaching the position sensor to an outer periphery of the cylinder tube through the intermediary of a sensor attachment bracket, a nut plate into which the fixing screw is screwed, and a protecting cover covering the position sensor and the fixing screw, wherein the position sensor and the protecting cover are able to be concurrently mounted to the cylinder tube using the fixing screw through the intermediary of a sensor attachment bracket by forming the nut plate from a portion of the protecting cover, and in addition, when the position sensor is position-adjusted, the position sensor and the protecting cover are enabled to be displaced together.

4 Claims, 5 Drawing Sheets

FOREIGN PATENT DOCUMENTS

| | | |
|---|---|---|
| GB | 1 311 021 | 3/1973 |
| GB | 2 258 771 A | 2/1993 |
| JP | 61-206810 | 9/1986 |
| JP | 8-110202 | 4/1996 |

* cited by examiner

PISTON POSITION DETECTING DEVICE OF FLUID PRESSURE CYLINDER

TECHNICAL FIELD

The present invention relates to a piston position detecting device of a fluid pressure cylinder configured in a manner such that an operating position of a piston moving back and forth in a cylinder tube by the action of fluid pressure is detected by a magnet mounted to the piston and a magnetic sensing type position sensor attached to the cylinder tube.

BACKGROUND ART

A piston position detecting device like this has been hitherto well known as described in, for example, Patent Document, Japanese Unexamined Patent Application Publication No. 08-110202. The art described in the Patent Document is such that a sensor supporting piece member is fixed on the outer surface of a cylinder tube using a band, and a position sensor is attached to the sensor supporting piece member using a fixing screw; an operating position of the piston is detected by sensing magnetism of a magnet mounted to the piston by means of the position sensor.

However, since the conventional piston position detecting device is provided with a position sensor attached in a state of being exposed to the outside, in the case, for example, that a fluid pressure cylinder is used for an automatic welding machine for welding an automobile vehicle body or the like, such a problem tends to arise that the position sensor is contaminated by a spatter spattered during welding work, or it becomes difficult to remove the position sensor or to adjust the position thereof because a groove or a hole, which is provided for setting a tool on the head of a fixing screw, is clogged with a spatter to make turning of the fixing screw difficult. In addition, it also happens that other equipment comes into contact with the position sensor to damage it.

Although the above problem is resolved if the position sensor is covered with a cover, it is required to provide a mechanism for installing the cover in addition to a mechanism for attaching the position sensor and the construction of the position detecting device therefore becomes complicated. Moreover, since the cover is obstructive when attaching and detaching of the position sensor, adjusting of the position thereof, or the like is implemented, it is necessary to remove the cover before such a job is executed and, on top of that, the job of attaching and detaching of the cover and the job of attaching and detaching of the position sensor should be done separately; these jobs are very troublesome, and take time and effort.

DISCLOSURE OF INVENTION

Thus, the object of the present invention is to provide a piston position detecting device having an effective and rational design construction, the piston position detecting device being able to protect a position sensor and a fixing screw from a spatter at the occasion of welding work as well as from contact with a foreign object by means of a protecting cover covering the position sensor and the fixing screw, and moreover to allow the attachment of the protecting cover to be implemented easily in association with the attachment of the position sensor and the fixing screw.

In order to achieve the above object, a piston position detecting device of a fluid pressure cylinder is characterizing in including a position sensor, a fixing screw for attaching the position sensor to an outer periphery of the cylinder tube through the intermediary of a sensor attachment bracket, a nut plate into which the fixing screw is screwed, and a protecting cover covering the position sensor and the fixing screw, wherein the position sensor and the protecting cover are able to be concurrently mounted to the cylinder tube using the fixing screw through the intermediary of a sensor attachment bracket by forming the nut plate from a portion of the protecting cover, and in addition, when the position sensor is position-adjusted in a state that the fixing screw is loosened, the protecting cover is enabled to be displaced in the direction of the cylinder axis line together with the position sensor in a state of covering the position sensor.

It is preferable in the present invention that the protecting cover includes a driving hole through which a tool for turning the fixing screw is inserted, and a hole cover for opening/closing the driving hole, the driving hole being freely displaced to a hole opening position, in which the driving hole is exposed, or to a hole closing position, in which the driving hole is covered.

The hole cover is preferably freely displaced in a pivoting manner or in a sliding manner in a state of being attached to the protecting cover.

It is also preferable in the present invention that the protecting cover includes a top face covering portion for covering a top face of the position sensor, first and second side face covering portions for covering respective side faces of the position sensor, and a front face covering portion for covering a tip end face of the position sensor; the end face of the protecting cover opposing to the front face covering portion is left open to allow the lead wire of the position sensor to extend outside thereof.

According to a specific embodiment of the present invention, the position sensor and the protecting cover are fixed to the sensor attachment bracket, which is formed as an individual member separate from the position sensor and fixed to the cylinder tube, by screwing the fixing screw into the nut plate, which is served also by the second side face covering portion of the protecting cover, through the position sensor and the sensor attachment bracket.

According to another specific embodiment of the present invention, a bracket attachment groove having its opening portion width smaller than its inner portion width is formed on an outer periphery of the cylinder tube in the direction of the cylinder axis line, the sensor attachment bracket holding the position sensor is provided on flat opening edge portions of the bracket attachment groove, the nut plate of the protecting cover is fitted in the bracket attachment groove, and the sensor attachment bracket and the protecting cover are fixed to the cylinder tube by screwing the fixing screw into the nut plate through the sensor attachment bracket.

According to the present invention having the above configurations, it is possible to protect these position sensor and fixing screw from a spatter at the occasion of welding work and also from contact with a foreign object. It is also possible, since the protecting cover is provided with another function of a nut into which the fixing screw for fixing the position sensor or the sensor attachment bracket is screwed, that the attachment of the protecting cover is able to be easily implemented in connection with the attachment of these position sensor, sensor attachment bracket, and the like by means of the common fixing screw. In addition, when the position sensor is position-adjusted, the protecting cover is able to be displaced in the direction of the cylinder axis line together with the position sensor in a state of covering the position sensor, which brings about an advantage that the protecting cover is not necessary to be removed.

BEST MODES FOR CARRYING OUT THE INVENTION

In FIG. 1 to FIG. 5, a first embodiment of a fluid pressure cylinder provided with a piston position detecting device according to the present invention is shown. This fluid pressure cylinder 10 has a cylindrical cylinder tube 11 composed of a non-magnetic raw material such as aluminum, aluminum alloy, or the like. In the inside of the cylinder tube 11, a circular cylinder chamber 12 is formed, and in the cylinder chamber 12, a circular piston 13 is accommodated so as to be able to move freely back and forth along a cylinder axis line L, which is the center axis line of the cylinder. On an outer periphery of the piston 13, there is installed a toroidal magnet 14 that becomes an object to be detected when position detection is implemented.

At the end portion of the cylinder tube 11 on its head side (the right side in FIG. 1), a sealing block is fitted in, the sealing block being not shown, and one end of the cylinder chamber 12 is blocked by this sealing block. Likewise, at the end portion of the cylinder tube 11 on its rod side (the left side in FIG. 1), a rod cover 16 is installed, and the other end of the cylinder chamber 12 is blocked by this rod cover 16. And, the cylinder chamber 12 is partitioned by the piston 13 to form pressure chambers between the piston 13 and the respective sealing block and rod cover 16, and there are formed ports P1, P2 at the end of the cylinder tube 11 on its head side and in the rod cover 16, the ports P1, P2 being connected to these pressure chambers, respectively. The fluid pressure cylinder 10 is constructed so that the piston 13 is actuated back and forth along the cylinder axis line L by supplying a pressurized fluid such as pressurized air or the like to each of the both pressure chambers and by discharging it from each of the both pressure chambers alternately through these ports P1, P2.

To the piston 13, there is connected the base end portion of a rod 17 extending along the cylinder axis line L, and the tip portion of the rod 17 passes through the rod cover 16 so as to be freely slidable and extends outside the cylinder tube 11.

On an outer periphery of the cylinder tube 11, there are attached sensor devices 20 constituting, together with the magnet 14, the piston position detecting device. The sensor devices 20 are provided two in number at different positions in the direction of the cylinder axis line L to detect the positions of the piston 13 at its forward stroke end and its backward stroke end; the configurations thereof are identical to each other and the configuration is as follows.

Figure 4:
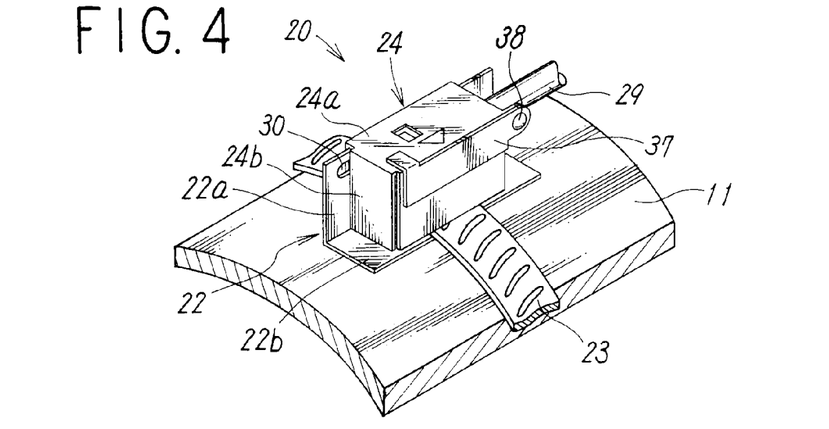
FIG. 4 is a perspective view of a sensor device constituting the piston position detecting device.
Figure 5:
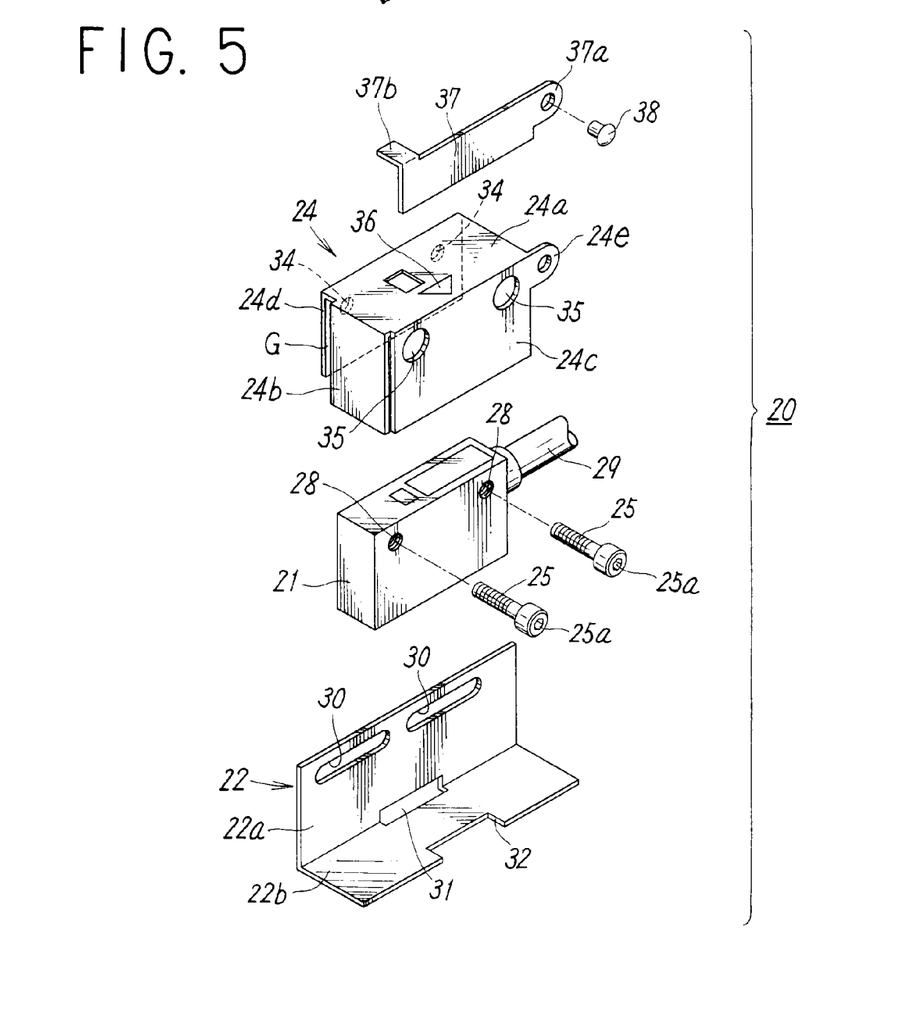
FIG. 5 is an exploded perspective view of FIG. 4.

That is, the sensor device 20 is constituted of a position sensor 21 for detecting the position of the piston 13 by sensing magnetism of the magnet 14, a sensor attachment bracket 22 for attaching the position sensor 21, a band 23 for fixing the sensor attachment bracket 22 to the cylinder tube 11, which is the attachment object, a protecting cover 24 covering the position sensor 21 to protect it from a collision with a foreign object and adhesion of a spatter at the occasion of welding work, and two fixing screws 25 for mounting the position sensor 21 and the protecting cover 24 to the sensor attachment bracket 22, as known from FIG. 4 and FIG. 5.

The position sensor 21 has a slightly laterally slim rectangular block-like shape, and is provided with two mounting holes 28 in an upper side portion on the side face thereof and near the both end portions in its longitudinal direction, the two mounting holes 28 being for allowing the fixing screws 25 to pass therethrough. And, from one end face of the position sensor 21 in its longitudinal direction, a lead wire 29 extends and a connector 29a for connecting it to other control equipment is mounted at the tip of the lead wire 29.

The fixing screw 25 is provided with an Allen hex socket 25a in its head portion and is pivotably driven with a tool such as an Allen wrench or the like fitted in the Allen hex socket 25a.

The sensor attachment bracket 22 is formed of a plate of non-magnetic metal such as aluminum, aluminum alloy, stainless steel or the like, or a hard member such as plastic or the like into an L-shape in cross section, and includes a slim flat plate-like base portion 22b extending in the direction of the cylinder axis line L with keeping contact with the outer periphery of the cylinder tube 11 and a slim flat plate-like sensor attachment portion 22a being bent upward from one side edge of the base portion 22b in its short side direction toward the outside of the cylinder tube 11 and extending in the direction of the cylinder axis line L. In the positions close to the upper end of the sensor attachment portion 22a, there are formed two screw pass-through holes 30 corresponding to the above mounting holes 28 of the position sensor 21 so as to each extend straight slenderly in the direction of the cylinder axis line L. The heights of these screw pass-through holes 30 from the base portion 22b are mutually identical. Incidentally, it is preferable that the base portion 22b is curved in an arc shape along the outer periphery surface of the cylinder tube 11.

In addition, in an intermediate position of the sensor attachment bracket 22 in its longitudinal direction, there is formed a band pass-through hole 31 for passing through the band 23 in a position where the base portion 22b and the sensor attachment portion 22a are connected to each other, and further at an edge of the base portion 22b, there is formed a cut portion 32 with which the band 23 is engaged. And, the base portion 22b is sandwiched between the band 23 and the outer periphery of the cylinder tube 11 in a manner such that the band 23 passed through the band pass-through hole 31 is wrapped around the outer periphery of the cylinder tube 11 and the both ends of the band 23 are mutually tightened using a tightening member 33, and thereby the sensor attachment bracket 22 is secured to the cylinder tube 11.

The band 23 is formed of a flexible metal strip or a plastic strip.

The above protecting cover 24 is formed of a non-magnetic metal such as aluminum, aluminum alloy, stainless steel or the like, or a hard raw material such as plastic or the like into an inverted channel shape in cross section, and includes a top face covering portion 24a for covering a top face of the position sensor 21, a front face covering portion 24b for covering a tip end face of the position sensor 21, a first side face covering portion 24c for covering one side face of the position sensor 21, a second side face covering portion 24d for covering the other side of the position sensor 21 through the intermediary of the sensor attachment portion 22a of the sensor attachment bracket 22; the end face of the protecting cover 24 opposing to the front face covering portion 24b is left open to lead out the lead wire 29 of the position sensor 21.

The second side face covering portion 24d of the protecting cover 24 serves as a nut plate into which the two fixing screws 25 are screwed when the position sensor 21 and the protecting cover 24 are mounted to the sensor attachment bracket 22 using the fixing screws 25, and therefore, there are provided two threaded holes 34 in the second side face covering portion 24d, i.e., the nut plate 24d.

It is noted that the above "first side face covering portion" is denoted merely as a "side face covering portion" and the "second side face covering portion" is denoted as a "nut plate" in the following explanation regarding this first embodiment.

Between the front face covering portion 24b and the nut plate 24d, a gap G is formed in which the sensor attachment portion 22a of the sensor attachment bracket 22 intervenes, and is configured so that the sensor attachment portion 22a is able to be displaced in the direction of the cylinder axis line L relatively with respect to the protecting cover 24.

Moreover, in the positions close to the upper end of the side face covering portion 24c, there are provided two driving holes 35 for inserting a tool when the fixing screws 25 are pivotably driven, and in the top face covering portion 24a, there is provided a sensitivity position mark 36 for indicating a sensitivity position of the position sensor 21. The hole size of each of the driving holes 35 is to be larger to some extent than the diameter of the head portion of the fixing screw 25.

The protecting cover 24 is formed in a size to allow the position sensor 21 to be fully accommodated in the inside thereof, and the sensor attachment bracket 22 is formed so that its length in the direction of the cylinder axis line L is to be longer than that of the protecting cover 24.

The protecting cover 24 also includes a hole cover 37 for covering the driving holes 35 of the side face covering portion 24c. The hole cover 37 is a slim plate-like member laterally extending along an upper half of the outer surface of the side face covering portion 24c, and is formed of a raw material similar to that of the protecting cover 24. At one end of the hole cover 37, there is formed a support portion 37a, which is connected freely pivotably using a pivotal shaft (rivet) 38 to a similar support portion 24e formed at an end of the side face covering portion 24c. The hole cover 37 is configured to be repositioned to a hole opening position (chain line position in FIG. 2), in which the driving holes 35 are exposed, or to a hole closing position (solid line position in FIG. 2), in which the driving holes 35 are covered, by being pivoted with respect to the pivotal shaft 38. Moreover, for the purpose that the hole cover 37 is stably held at the position when positioned in the hole closing position, a stopper 37b is formed at the top edge of an end portion of the hole cover 37 and is secured on the top face of the protecting cover 24.

The position sensor 21 and the protecting cover 24 are each attached to the sensor attachment bracket 22 mounted to the cylinder tube 11 as described below.

That is, the protecting cover 24 is mounted to the sensor attachment bracket 22 in a state of accommodating the position sensor 21 in its inside so that the sensor attachment portion 22a is fitted into the gap G between the front face covering portion 24b and the nut plate 24d. At this time, the position sensor 21 is situated in the position opposite to the nut plate 24d with respect to the sensor attachment portion 22a, i.e., the position sensor 21 is situated on the side of one side face of the sensor attachment portion 22a and the nut plate 24d is situated on the side of the other side face thereof.

Alternatively, after the protecting cover 24 is mounted to the sensor attachment bracket 22, the position sensor 21 may be inserted into the inside of the protecting cover 24 from its open end side along one side of the sensor attachment portion 22a.

Figure 1:
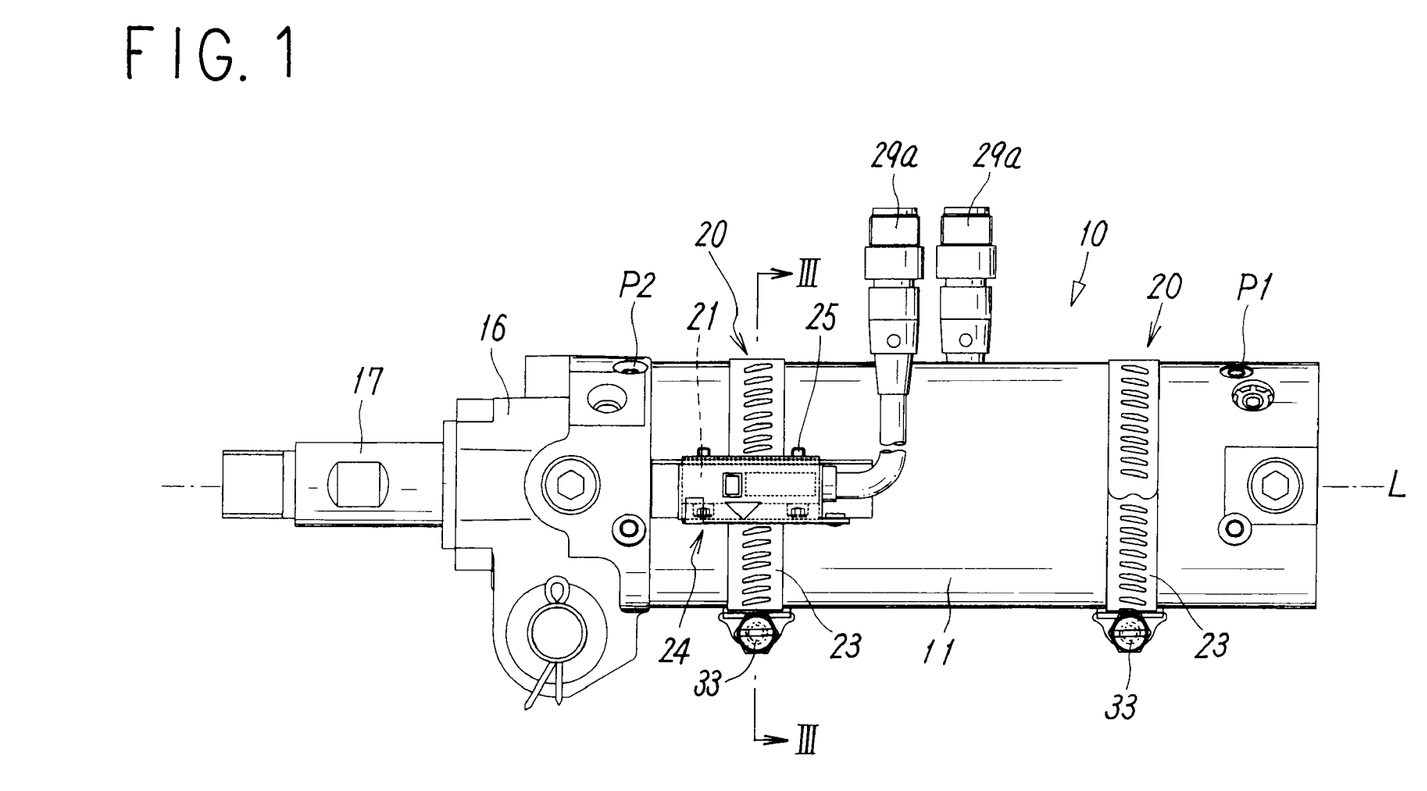
FIG. 1 is a side view showing a first embodiment of a fluid pressure cylinder provided with a piston position detecting device according to the present invention.
Figure 2:
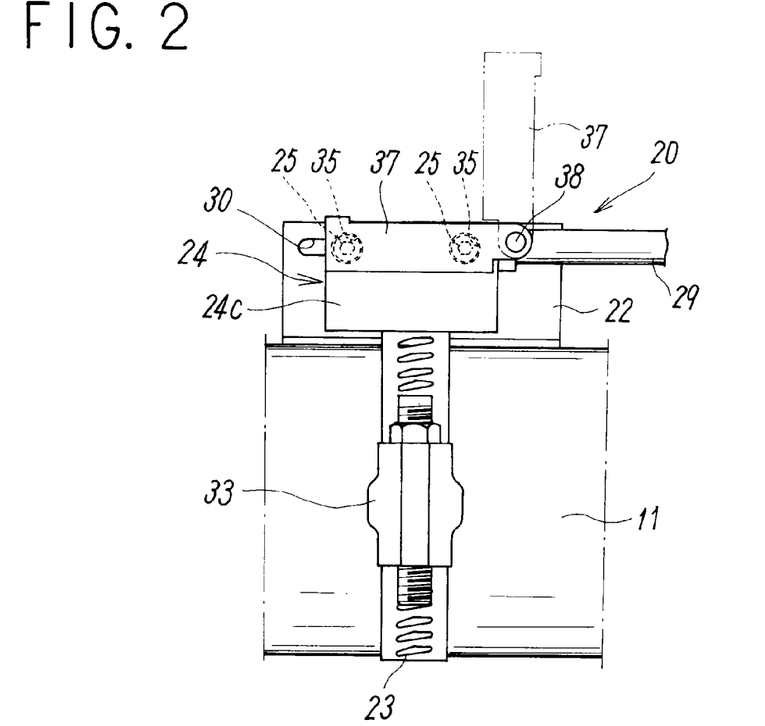
FIG. 2 is a bottom plan view of a key portion of FIG. 1.
Figure 3:
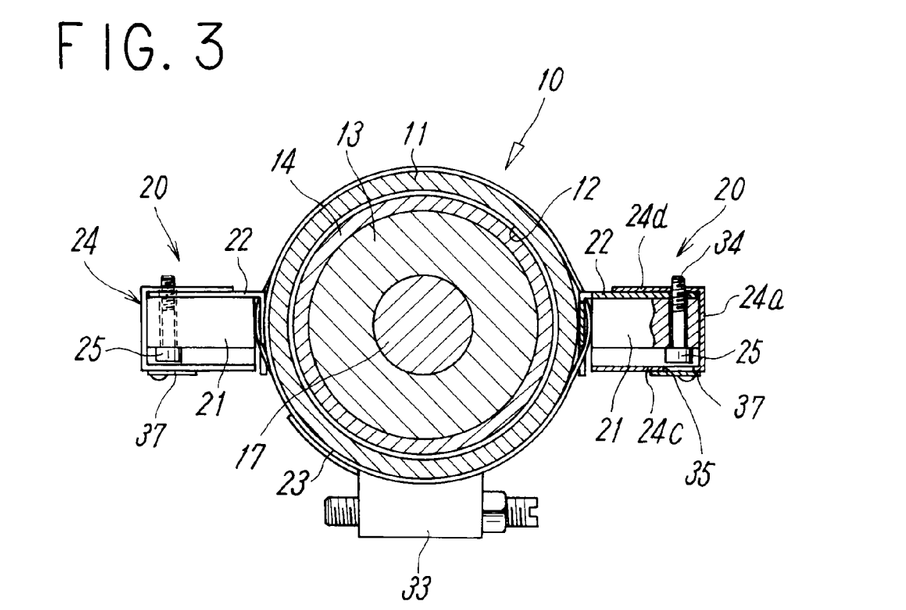
FIG. 3 is a cross-section view taken from line III-III of FIG. 1.

Next, the hole cover 37 is pivoted to the hole opening position shown in FIG. 2 with a chain line, and after the two fixing screws 25 are each inserted from the driving hole 35 into the mounting hole 28 of the position sensor 21 and the screw pass-through hole 30 of the sensor attachment bracket 22 so that its tip reaches the threaded hole 34 of the nut plate 24d, a tool such as an Allen wrench or the like is inserted into the respective driving holes 35 to pivot the fixing screw 25 and fix it to the threaded hole 34. Consequently, the sensor attachment portion 22a is sandwiched between the position sensor 21 and the nut plate 24d, and thereby these position sensor 21, nut plate 24d and sensor attachment portion 22a are fixed to each other, which results in that both the position sensor 21 and the protecting cover 24 are attached to the sensor attachment bracket 22 at the same time by means of the common fixing screws 25.

In this case, it is preferable that the fixing screws 25 are each screwed into the threaded hole 34 loosely at first, and after the position sensor 21 and the protecting cover 24 are position-adjusted by being moved along the sensor attachment bracket 22 with the state being kept, they are fixed at the respective positions by being tightly screwed by the fixing screw 25. Incidentally, the range in which the position sensor 21 and the protecting cover 24 are each able to be displaced is within the length of either of the screw pass-through holes 30 formed in the sensor attachment bracket 22.

When the attachment of the position sensor 21 and the protecting cover 24 is completed, the hole cover 37 is restored to the hole closing position shown in FIG. 2 with a solid line.

In the case when the position sensor 21 is position-adjusted after having been attached to the sensor attachment bracket 22, the hole cover 37 is pivoted to the hole opening position, and after a tool is inserted from the driving holes 35 and the fixing screws 25 are unscrewed to the extent of being not come off from the threaded hole 34 of the nut plate 24d, the position sensor 21 and the protecting cover 24 are displaced in the direction of the cylinder axis line L with respect to the sensor attachment bracket 22 with the state being kept. After being halted at a required position, each of the position sensor 21 and the protecting cover 24 is fixed at the position by re-screwing the fixing screw 25.

Since the sensor device 20 is constructed like this, the position sensor 21 and the fixing screws 25 are protected from adhesion of a spatter spattered during welding work and also from contact with a foreign object; thereby, not only contamination and damage of the position sensor 21 is prevented, but also such inconvenience is avoided that the fixing screw 25 is disabled to be pivotably driven due to clogging of the Allen hex socket 25a of the head portion thereof with the spatter.

In addition, since the protecting cover 24 is also provided with a function to serve as nuts into which the fixing screws 25 are screwed, it becomes possible to attach the position sensor 21 and the protecting cover 24 to the sensor attachment bracket 22 using the common fixing screws 25; thereby, the attachment and detachment of the protecting cover 24 can be easily and rationally implemented in connection with attaching and detaching the position sensor 21. Furthermore, there is an advantage such that, since the protecting cover 24 is able to be displaced in the direction of the cylinder axis line L together with the position sensor 21 in a state of covering the position sensor 21, the protecting cover 24 is not necessary to be removed when the position sensor 21 is position-adjusted.

In the above embodiment, although the hole cover 37 is configured to be freely pivotable to the hole closing position and the hole opening position, taking the pivotal shaft 38 as a pivot, the hole cover may be configured so as to allow the driving holes 35 to be opened or closed by sliding in an up-and-down direction or a left-and-right direction (lateral direction) along the side face covering portion 24c in a state of being mounted to the protecting cover 24.

Likewise, although the sensor attachment bracket 22 is secured to the cylinder tube 11 using the band 23 in the example shown in the attached figures, the sensor attachment bracket 22 may be mounted to the cylinder tube 11 using other appropriate means such as a screw or the like.

Figure 6:
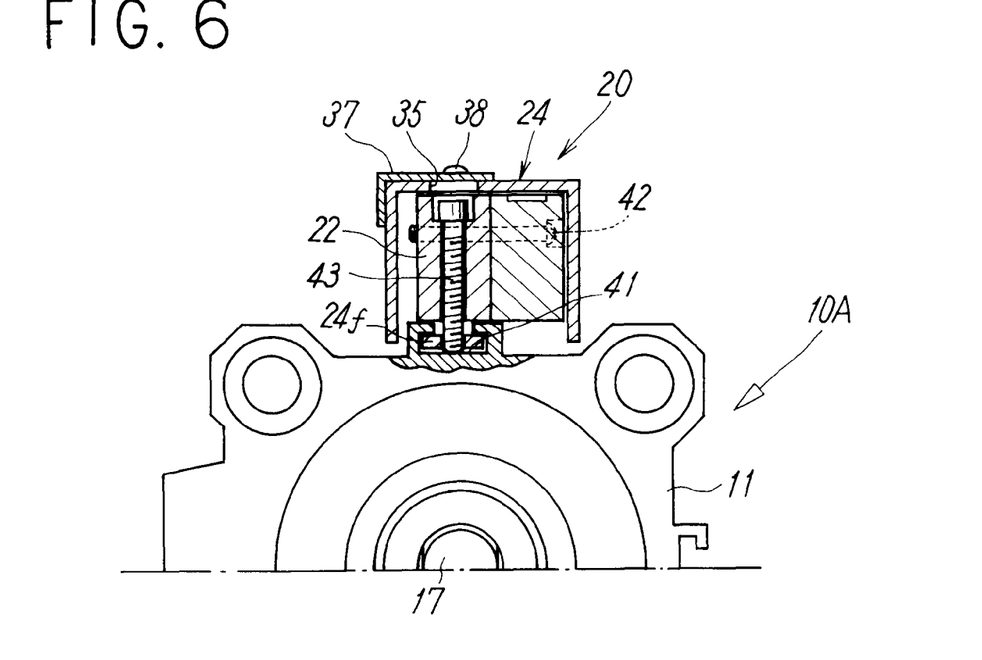
FIG. 6 is a partial elevation view showing a second embodiment of a fluid pressure cylinder provided with a piston position detecting device according to the present invention.
Figure 7:
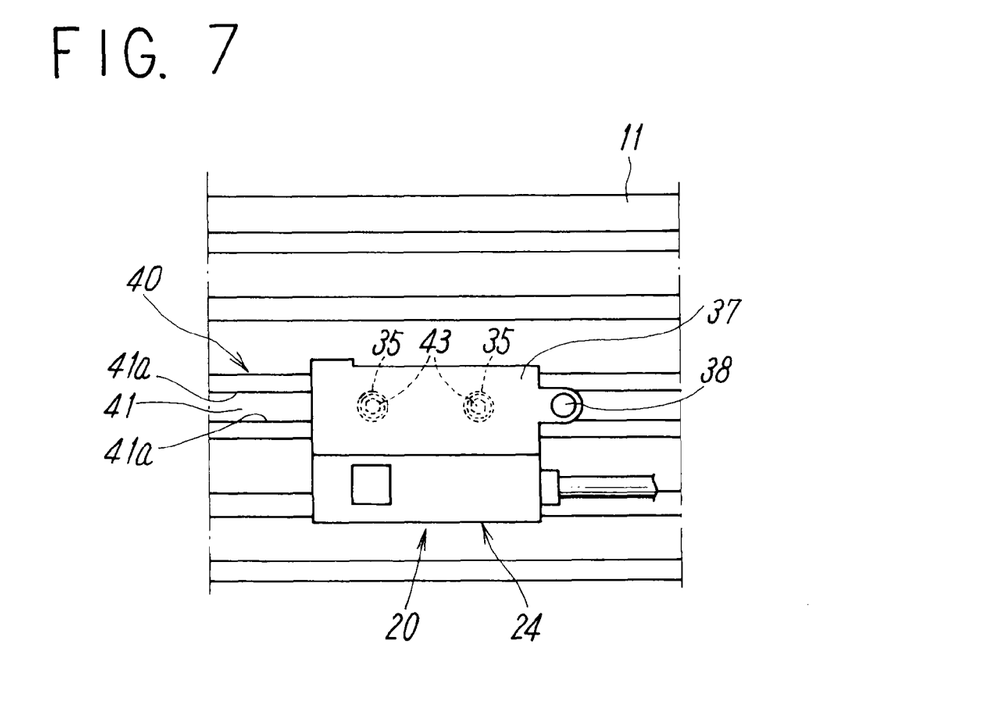
FIG. 7 is a plan view of FIG. 6.
Figure 8:
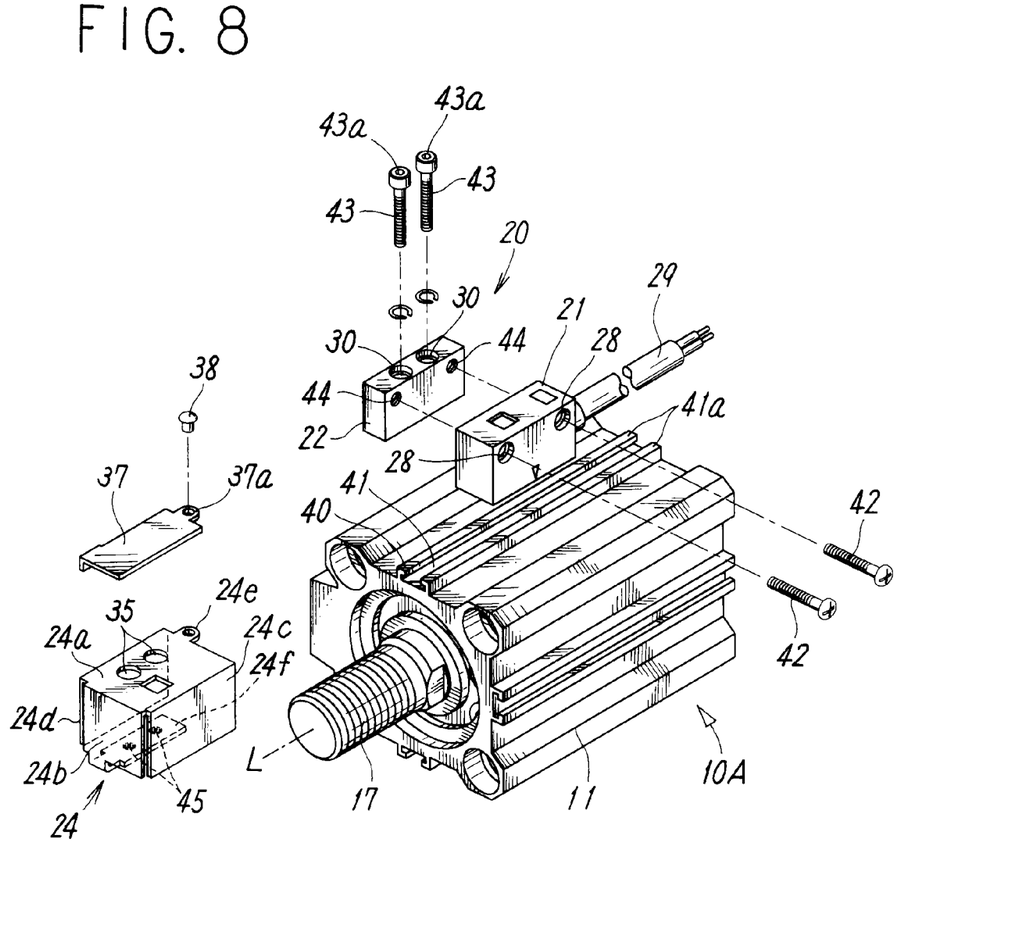
FIG. 8 is an exploded perspective view of FIG. 6.

In FIG. 6 to FIG. 8, a second embodiment of a fluid pressure cylinder provided with a piston position detecting device according to the present invention is shown. This fluid pressure cylinder 10A has a cylinder tube 11 having a substantially rectangular cross-sectional shape, a piston provided with a magnet, the piston being accommodated in the inside of the cylinder tube 11, and a rod 17 connected to the piston, the rod 17 extending outside the cylinder tube 11; the basic construction like this is substantially identical to that of the fluid pressure cylinder 10 of the first embodiment described above.

On an outer periphery of the cylinder tube 11, there is formed a rail 40 extending in the direction of the cylinder axis line L on at least one of four side faces, and a bracket attachment groove 41 is provided in the rail 40. This bracket attachment groove 41 has a pair of flat opening edge portions 41a extending inwardly in its opening portion, and thereby the opening portion width of the groove is narrower than the inner portion width thereof. A sensor device 20 is attached to the cylinder tube 11 through the use of the rail 40 and the bracket attachment groove 41.

Although only one set of the sensor device is shown in the exemplary illustration, there are provided two sets of the sensor device 20 at different positions in the direction of the cylinder axis line L in the case when positions of the piston at its forward stroke end and its backward stroke end are detected.

The sensor device 20 is provided with a position sensor 21, a sensor attachment bracket 22 for fixing and holding the position sensor 21, two sensor fixing screws 42 for fixing the position sensor 21 to the sensor attachment bracket 22, two fixing screws 43 for mounting the sensor attachment bracket 22 to the cylinder tube 11, which is the attachment object, and a protecting cover 24 covering these sensor attachment bracket 22, position sensor 21, sensor fixing screws 42 and fixing screws 43. The fixing screw 43 is provided with an Allen hex socket 43a in its head portion.

The position sensor 21 has a rectangular block-like shape, and is provided with two mounting holes 28 on the side face thereof as with the position sensor 21 in the first embodiment described above, the two mounting holes 28 being for allowing the sensor fixing screws 42 to pass therethrough.

Likewise, the sensor attachment bracket 22 has a rectangular block-like shape, and is provided with two screw pass-through holes 30 in its up-and-down direction (vertical direction) for allowing the fixing screws 43 to pass therethrough as well as two threaded holes 44, into which the sensor fixing screws 42 are screwed, in its left-and-right direction (lateral direction). The thickness of the sensor attachment bracket 22 is larger than the opening portion width of the bracket attachment groove 41.

In addition, the protecting cover 24 includes, as with the protecting cover 24 in the first embodiment, a top face covering portion 24a, a front face covering portion 24b, a first side face covering portion 24c and a second side face covering portion 24d, but as different from the protecting cover 24 in the first embodiment, the protecting cover 24 has a nut plate 24f provided with threaded holes 45, into which fixing screws 43 for fixing the sensor attachment bracket 22 are screwed, and this nut plate 24f is formed to be integral to a lower end portion of the front face covering portion 24b and extends in parallel to the top face covering portion 24a toward the open end side of the protecting cover 24, i.e., the side opposite to the side in which the front face covering portion 24b is provided. The protecting cover 24 is, also as different from the protecting cover 24 in the first embodiment, provided with two driving holes 35 for pivotably driving the fixing screws 43 in the top face covering portion 24a. Accordingly, a hole cover 37 for opening/closing the driving holes 35 is mounted on the upside of the top face covering portion 24a, and is configured to be freely pivotable, taking the pivotal shaft 38 provided at one end thereof as a pivot. The hole cover 37, however, may be of a slide type.

The nut plate 24f is formed so as to be insertable into the bracket attachment groove 41 and to have a width smaller than the inner portion width of the bracket attachment groove 41 but larger than the opening portion width thereof, and thereby the nut plate 24f does not come off through the opening portion to the outside.

And, on the occasion when the position sensor 21 is attached on a side face of the sensor attachment bracket 22 using the two sensor fixing screws 42, the nut plate 24f of the protecting cover 24 is inserted into the bracket attachment groove 41 from an end portion of the cylinder tube 11, and both the sensor attachment bracket 22 and the position sensor 21 are inserted into the inside of the protecting cover 24 from its open end side. Then, after the two driving holes 35 are made exposed by displacing the hole cover 37 to a hole opening position, the two fixing screws 43 are inserted from the driving holes 35 into the screw pass-through holes 30 of the sensor attachment bracket 22 and screwed tightly in the threaded holes 45 of the nut plate 24f using a tool. The opening edge portions 41a of the bracket attachment groove 41 are thereby tightly sandwiched between these sensor attachment bracket 22 and nut plate 24f, and thus these sensor attachment bracket 22 and nut plate 24f (i.e., protecting cover 24) are fixed to the cylinder tube 11.

In the case when the position sensor 21 is position-adjusted, the hole cover 37 is pivoted to the hole opening position, and after a tool is inserted from the driving holes 35 and the fixing screws 43 fixing the sensor attachment bracket 22 are unscrewed to the extent of being not come off from the threaded holes 45 of the nut plate 24d, the sensor attachment bracket 22 is displaced in the direction of the cylinder axis line L along the bracket attachment groove 41 together with the protecting cover 24 in the state thereof. After being halted at a required position, each of the sensor attachment bracket 22 and the protecting cover 24 is fixed at the position by re-screwing the fixing screw 43.

Since the construction and function of the second embodiment other than described above are substantially identical to the first embodiment, identical constitutional portions are indicated by the same reference characters as those of the first embodiment, and repeated descriptions are omitted.

It is noted that, in the second embodiment, the sensor attachment bracket 22 is able to be constructed to be integral with the position sensor 21. In this case, the sensor fixing screws 42, the mounting holes 28 for allowing the sensor fixing screws 42 to pass therethrough, and the threaded holes 44 into which the sensor fixing screws 42 are screwed are omitted.

In addition, in the case that either of a forward stroke end position and a backward stroke end position of the piston 13 is detected in the above embodiments, one set of the sensor device 20 is installed.

The invention claimed is:

1. A piston position detecting device of a fluid pressure cylinder for detecting an operating position of a piston moving back and forth in the inside of a cylinder tube in a direction of a cylinder axis line, using a magnet mounted to the piston and a position sensor attached to the cylinder tube, comprising:
   the position sensor;
   a fixing screw that attaches the position sensor to an outer periphery of the cylinder tube through a sensor attachment bracket that comes into contact with the outer periphery;
   a nut plate into which the fixing screw is screwed; and
   a protecting cover that is disposed so as not to come into contact with a head of the fixing screw and covers the position sensor and the whole head of the fixing screw,
   wherein the nut plate is formed of a same member as the protecting cover in a part of the protecting cover, the position sensor and the protecting cover are configured to be concurrently mounted to the cylinder tube using the fixing screw through an intermediary of the sensor attachment bracket, and in addition, when the position sensor is position-adjusted in a state that the fixing screw is loosened, the protecting cover is enabled to be displaced in the direction of the cylinder axis line together with the position sensor in a state of covering the position sensor, and
   wherein the protecting cover is provided as a member separate from the sensor attachment bracket and includes a driving hole through which a tool for turning the fixing screw is inserted into an inside of the protecting cover and a hole cover to open/close the driving hole, one end of the hole cover being connected freely pivotably to the protecting cover with a rivet, the hole cover being pivotably driven with the rivet, and the hole cover being displaceable to a hole closing position in which the driving hole is covered or to a hole opening position in which the driving hole is exposed.

2. The piston position detecting device according to claim 1, wherein the protecting cover includes a top face covering portion to cover a top face of the position sensor, first and second side face covering portions to cover respective side faces of the position sensor, and a front face covering portion to cover a tip end face of the position sensor, and also wherein an end face of the protecting cover opposing to the front face covering portion is left open to allow a lead wire of the position sensor to extend outside thereof.

3. The piston position detecting device according to claim 2, wherein the position sensor and the protecting cover are fixed to the sensor attachment bracket, which is formed as an individual member separate from the position sensor and fixed to the cylinder tube, by screwing the fixing screw into the nut plate, which is served also by the second side face covering portion of the protecting cover, through the position sensor and the sensor attachment bracket.

4. A piston position detecting device of a fluid pressure cylinder for detecting an operating position of a piston moving back and forth in the inside of a cylinder tube in a direction of a cylinder axis line, using a magnet mounted to the piston and a means for sensing position attached to the cylinder tube, comprising:
   the position sensing means;
   a means for fixing the position sensing means to attach to an outer periphery of the cylinder tube through of a means for attaching the position sensing means that comes into contact with the outer periphery;
   a means for securing the position sensing means into which the fixing means is screwed; and
   a means for protecting the position sensing means by the protecting means being disposed so as not to come into contact with a head of the fixing means and by the protecting means covering the position sensing means and the whole head of the fixing means,
   wherein the securing means is formed of a same member as the protecting means in a part of the protecting means, the position sensing means and the protecting means are configured to be concurrently mounted to the cylinder tube using the fixing means through an intermediary of the attaching means, and in addition, when the position sensing means is position-adjusted in a state that the fixing means is loosened, the protecting means is enabled to be displaced in the direction of the cylinder axis line together with the position sensing means in a state of covering the position sensing means, and
   wherein the protecting means is provided as a member separate from the attaching means and includes a means for receiving through which a tool for turning the fixing means is inserted into an inside of the protecting means and a means for covering to open/close the receiving means, one end of the covering means being connected freely pivotably to the protecting means with a rivet, the covering means being pivotably driven with the rivet, and the covering means being displaceable to a hole closing position in which the receiving means is covered or to a hole opening position in which the receiving means is exposed.

\* \* \* \* \*